United States Patent Office 3,454,514
Patented July 8, 1969

3,454,514
STABILIZED VINYL HALIDE COMPOSITIONS
Gerald A. Baum, Paramus, N.J., assignor to M & T
Chemicals Inc., New York, N.Y., a corporation of
Delaware
No Drawing. Filed June 29, 1966, Ser. No. 561,345
Int. Cl. C08f 45/62, 29/14
U.S. Cl. 260—23                                    7 Claims

ABSTRACT OF THE DISCLOSURE

A storage-stable stabilizer composition for vinyl halide resin compositions which comprises as a stabilizer base: (a) a cadmium salt of an organic monocarboxylic acid, (b) a salt selected from the group consisting of barium and strontium salts of organic monocarboxylic acids, wherein one of salts (a) and (b) is a salt of an aliphatic monocarboxylic acid and the other is salt of an aromatic monocarboxylic acid, and (c) a zinc salt of an organic monocarboxylic acid; and as about 1% to 50% by weight of said stabilizer base composition, a storage-stable additive comprising about 1 to 50 parts of a higher alkyl monoether of an alkylene glycol and about 1 to 50 parts of an organic carboxylic acid selected from the group consisting of aliphatic monocarboxylic acids and aliphatic dicarboxylic acids.

---

This invention relates to a storage-stable composition which may be employed in the stabilization of halogen-containing polymer compositions.

Halogen-containing polymers, such as polyvinyl chloride homopolymers and copolymers, are useful because of their desirable physical properties. Uses of these materials have been limited, however, because of their susceptibility to discoloration due to heat degradation. In order to protect against heat degradation, various stabilizing compositions have been employed, including stabilizers containing barium and cadmium compounds. Such stabilizers may afford excellent protection to halogen-containing resins against the deteriorative effects of heat, but they may undesirably contribute to formation of or fail to protect against the development of dark colors during milling or cross-staining when in contact with resins which have been stabilized with lead-containing systems. They may also be subject to deterioration during storage. To remedy some of these defects, zinc-containing ingredients may be added, but the effectiveness of these modified stabilizers has been limited by instability particularly characterized by their tendency to precipitate on storage which renders them unsatisfactory.

It is an object of this invention to provide a stabilizer composition for halogen-containing polymers which is storage-stable and in particular which is substantially free of tendency to precipitate during storage. Other objects will be apparent to those skilled-in-the-art on inspection of the following description.

In accordance with certain of its aspects, this invention relates to a novel storage-stable stabilizer composition useful for the preparation of heat-stable halogen-containing polymers which comprises as stabilizer base composition: (a) a cadmium salt of an organic carboxylic acid and (b) a salt selected from the group consisting of barium and strontium salts of organic carboxylic acids, one of salts (a) and (b) being a salt of an aliphatic carboxylic acid and the other being a salt of an aromatic carboxylic acid, and (c) a zinc salt of an organic carboxylic acid and, in amount of about 1%–50% of said base composition, a storage-stable additive comprising about 1–50 parts of a higher alkyl monoether of an alkylene glycol and about 1–50 parts of an organic carboxylic acid.

The polymer compositions which may be heat-stabilized in accordance with certain aspects of this invention may be halogen-containing organic polymers having incorporated therein from about 0.5% to about 5.0%, based on the weight of the polymer composition, of the above-described storage-stable stabilizer composition.

The polymers which may be stabilized may typically be those which contain chlorine atoms bonded to the polymer chain. These polymers may be homopolymers including polyvinyl chloride-type polymers, e.g. polyvinyl chloride, polyvinylidene chloride, etc. They may also include copolymers formed by the copolymerization of vinyl chloride or vinylidene chloride with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc. For convenience, reference will be hereinafter made to vinyl chloride polymers.

The vinyl chloride polymers may also contain plasticizers such as dioctyl phthalate; lubricating agents such as stearic acid; pigments; fillers; etc.

The cadmium salt of an organic carboxylic acid which may be employed in the practice of this invention, may, for example, be cadmium dilaurate, cadmium dipropionate, cadmium di(p-tert-butyl benzoate), cadmium dibenzoate, cadmium di (2,4 di-t-butyl benzoate), cadmium di-stearate, cadmium di($\beta$-phenyl acetate), and cadmium di(p-chlorophenyl benzoate). The preferred cadmium salt may be a cadmium salt of an aromatic carboxylic acid, typically cadmium di(p-tert-butyl benzoate).

The barium and strontium salts of organic carboxylic acids which may be used in practice of this invention may include barium laurate, barium stearate, barium di-octyl phenolate, barium di-nonyl phenolate, barium di-nonyl-o-cresolate, strontium laurate, strontium stearate, strontium di-octyl phenolate, strontium di-nonyl phenolate, strontium di-nonyl-o-cresolate, etc. The barium and strontium salts of organic carboxylic acids used may be in the form of complex salts, e.g. salts of barium with acid-esters of organic carboxylic acids. Typical of such a salt is the complex barium salt of high molecular weight aliphatic carboxylic acids sold by Lubrizol Corp. under the trademark LD–2101. This salt-complex may be characterized as a barium complex of high molecular weight aliphatic carboxylic acid-ester having a specific gravity at 15.6° C. of 1.16; a Brookfield viscosity at 25.0° C. (Model RVF, 20 r.p.m. No. 1 spindle, CPS) of 70–110; a viscosity (SSU) of 200 at 37.8° C. and 45 at 93° C.; a Viscosity Index of 125; a Gardner Color of 18+; and a minimum percentage of barium by weight of 20.2%. Most preferably the salt employed may be a barium salt, preferably of an aliphatic carboxylic acid, typically a barium complex salt of high molecular weight carboxylic acid-esters, say that sold under the trademark LD–2101.

The stabilizer compositions of this invention preferably contain a zinc salt of an organic carboxylic acid, for example zinc di(p-tert-butyl benzoate), zinc dibenzoate, zinc dilaurate, zinc di(2,4-di-t-butyl benzoate), and zinc di(p-chlorophenyl benzoate). The preferred zinc salt may be zinc di(p-tert-butyl benzoate).

In accordance with this invention, the composition may include as a component of the storage-stable additive, a higher alkyl monoether of an alkylene glycol (typically sold under the trademark Cellosolve) in which the alkyl group contains at least six carbon atoms, such as hexyl Cellosolve.

The higher alkyl monoether of the alkylene glycol may contain higher alkyl radicals, i.e. alkyl radicals which may contain at least six carbon atoms. Typical higher alkyl radicals may be straight chain alkyl or branched alkyl, including n-hexyl, isohexyl, heptyls, octyls including 2-ethyl hexyl, decyls, dodecyls, tetradecyl, octadecyl, etc. Preferred higher alkyl radicals may be alkyl radicals having 6–12 carbon atoms i.e. hexyls through dodecyls. The alkyl radicals may be inertly substituted, e.g. may bear a nonreactive substituent such as alkyl, aryl, cycloalkyl, aralkyl, alkaryl, alkenyl, ether, halogen, nitro, ester, etc. Typical substituted alkyls may include 3-chloropropyl, 2-ethoxyethyl, carboethoxymethyl, etc.

Typical higher alkyl monoethers of alkylene glycols which may be employed in the instant invention may include 2-hexoxy-ethanol-1 (i.e. hexyl Cellosolve); 2-heptoxy-ethanol-1; 2-octoxy-ethanol-1 (i.e. octyl Cellosolve); 2-nonoxy-ethanol-1; 2-decoxy-ethanol-1; 2-dodecoxy-ethanol-1; 2-hexoxy-propanol-1; 3-octoxy-propanol-1; etc. Preferably the monoether of the alkylene glycol may be a higher alkoxy substituted ethanol, typically 2-hexoxy-ethanol-1 (i.e. hexyl Cellosolve).

The novel composition of this invention may include an organic carboxylic acid. Typical carboxylic acids which may be employed include mono-carboxylic acids, e.g. acetic acid, propanoic acids, butanoic acids, pentanoic acids, hexanoic acids, heptanoic acids, octanoic acids including 2-ethyl hexanoic acid, nonanoic acids, decanoic acids, dodecanoic acids, octadecanoic acids, etc. Polycarboxylic acids typified by malonic acid, succinic acid, glutaric acid, adipic acid, pimelic acid, suberic acid, azelaic acid, sebacic acid, etc. may also be employed. Preferably the organic carboxylic acid may contain one carboxylic group and 6–18 carbon atoms, typically 8 carbon atoms, say 2-ethyl hexanoic acid.

Preferably the composition may include one part of organic carboxylic acid per 1–50 parts, say 1 part, of higher alkyl monoether of alkylene glycol; and this portion of the composition may be present in amount of 1%–50%, say 6% of the total stabilizer composition, all parts and percentages being by weight.

It is a feature of the novel stabilizer systems of this invention that they may contain tri-organo phosphites. Typical of such phosphites may be triphenyl phosphite, tris-nonyl phenyl phosphite, tris-p-chlorophenyl phosphite, phenyl-di-isodecyl phosphite and diphenyl decyl phosphite. The preferred phosphite may be triphenyl phosphite.

The components of the storage-stable additive compositions of this invention may be admixed together in the presence of a dilute. Typical diluents include iso-octyl alcohol, benzyl alcohol, β-phenylethanol, tridecyl alcohol, 2,4,4-trimethyl pentanol, and cresols, xylenols, etc.

Thus the novel storage-stable stabilizer compositions of this invention may include the following components (wherein, as elsewhere, all parts are parts by weight) indicating the preferred minima and maxima for normal usage:

TABLE I

| Component | Minimum | Maximum | Preferred |
|---|---|---|---|
| 1. Cadmium salt of organic carboxylic acid | 1 | 50 | 16.6 |
| 2. Barium and/or strontium salt of organic carboxylic acid | 1 | 50 | 19.9 |
| 3. Zinc salt of organic carboxylic acid | 0.5 | 10 | 2.9 |
| 4. Tri-organo phosphite | 0 | 75 | 34.5 |
| 5. Higher alkyl monoether of alkylene glycol | 0.5 | 10 | 5 |
| 6. Organic carboxylic acid | 0.5 | 10 | 5 |
| 7. Diluent | 1 | 50 | 14.1 |

It is noted that one of components 1 and 2 is a salt of an aliphatic carboxylic acid and the other is a salt of an aromatic carboxylic acid.

A preferred stabilizer system may be that set forth in Table II.

TABLE II

| Component | Minimum | Maximum | Preferred |
|---|---|---|---|
| 1. Cadmium (p-tert-butyl benzoate) | 1 | 50 | 16.6 |
| 2. Barium complex (LD-2101) | 1 | 50 | 19.9 |
| 3. Zinc (p-tert-butyl benzoate) | 0.5 | 10 | 2.9 |
| 4. Tri-phenyl phosphite | 0 | 75 | 34.5 |
| 5. 2-hexoxy-ethanol-1 | 0.5 | 10 | 5.0 |
| 6. 2-ethyl hexanoic acid | 0.5 | 10 | 5.0 |
| 7. Iso-octyl alcohol | 1 | 50 | 14.1 |

It is a particular feature of this invention that it may be possible to improve stabilizer systems containing cadmium and barium salts of organic carboxylic acids (wherein there may be present different residues as anions, one of an aliphatic carboxylic acid and the other of an aromatic carboxylic acid), by addition thereto, in amount of 1%–50% (preferably about 6%) of total mixture, of 1–50 parts of higher alkyl monoether of alkylene glycol and 1–50 parts of organic carboxylic acid. The preferred constituents may be 2-hexoxy-ethanol-1 (hexyl Cellosolve) and 2-ethyl hexanoic acid, present in amount of from about 1 to 3 parts of the former per from about 1 to 3 parts of the latter.

The novel stabilizing compositions may be formed by blending the components in an appropriate vessel. Typically, for example, the higher alkyl monoether of alkylene glycol and the carboxylic acid may be blended together and used as such. Alternatively these two compositions may be blended with the cadmium, zinc, and barium (or strontium) salts and homogeneously mixed to form a uniform mixture.

It will be apparent on inspection that this invention may permit attainment of novel "barium-cadmium type" stabilizers which may be characterized by extended storage life. For example, it may be possible to prepare a novel stabilizer system which will remain free of undesirable precipitate indefinitely. Systems have been prepared which have shown no precipitate after more than twenty-three months of storage at about 25° C. with exposure to light in contrast to control examples which precipitated after only eight days.

The novel stabilizing compositions (including storage-stable additive) may be used by adding about 0.5 to 5 parts, say 3 parts thereof, to 100 parts of a polymer such as a polyvinyl chloride. It will be found that the resultant polyvinyl chloride is stabilized against the deteriorative action of heat and light and is free of any undesirable precipitate arising from the stabilizer. Furthermore, the stabilized polymer is characterized by freedom from early color development (during or immediately after milling) and from cross-staining.

In order to clearly point out the novel features of this invention and to illustrate the unexpected results which may be obtained through its practice, the following examples are set forth wherein all parts (except as otherwise indicated) are by weight.

EXAMPLES 1–7

A stabilizer base for halogen-containing polymers may be prepared by mixing 165.6 parts of cadium (p-tert-butyl benzoate), 120 parts of a barium complex of a high molecular carboxylic ester (that sold by Lubrizol Corp. under the trademark LD-2101 as hereinbefore described), 207 parts of triphenyl phosphite, 90 parts of isooctyl alcohol diluent, and 17.4 parts of zinc (p-tert-butyl benzoate).

The stabilizer base for halogen-containing polymers may be divided into seven portions of 100 parts each. Two parts of each of the materials listed in Table III below may be homogeneously mixed with six of the portions of the stabilizer base. All seven portions may then be left standing over an extended period of time to determine the time necessary for formation of precipitate, thereby indicating a substantial diminution in storage-stability of the stabilizer for halogen-containing polymers.

The precipitate recorded is a dense crystalline precipitate readily distinguishable from minor turbidities which may be observed earler and which may result from the presence of minor impurities.

TABLE III

| Example | Stabilizer System | Time of Freedom from Precipitation |
|---|---|---|
| 1 | Stabilizer base plus 1:1 mixture of hexyl Cellosolve and 2-ethyl hexanoic acid. | No precipitate observed after 23 months of continuous testing. |
| 2 | Stabilizer base plus 1:1 mixture of butyl Cellosolve and 2-ethyl hexanoic acid. | 5 months. |
| 3 | Stabilizer base plus hexyl Cellosolve. | 4 months. |
| 4 | Stabilizer base plus 2-ethyl hexanoic acid. | 5 months. |
| 5 | Stabilizer base plus 1:1 mixture of butyl Carbitol and 2-ethyl hexanoic acid (Carbitol is a trademark for monoethers of dialkylene glycols). | 4 months. |
| 6 | Stabilizer base plus butyl Carbitol. | 40 days. |
| 7 | Stabilizer base. | 8 days. |

It will be apparent from inspection of the above table, and in particular by comparison of Example 1 (which is illustrative of the storage-stable products of this invention) with control Examples 2–7 that the novel technique of this invention may permit attainment of products characterized by extended storage life. Specifically the novel technique permits satisfactory storage life over 23 months in contrast to the storage life of 8 days to 5 months observed in control Examples 2–7.

EXAMPLES 8–10

Two (2.0) parts of the stabilizer system of Example 1, after having been left standing for 23 months, may be blended together with 100 parts of polyvinyl chloride having a specific gravity of 1.40, a Shore Durometer "D" hardness of 80 and an ultimate tensile strength of 7,000 p.s.i., sold under the trademark Geon 103EP (Example 8).

Two (2.0) parts of the stabilizer system of control Example 7 after having been left standing for 8 days, during which time precipitate forms in the stabilizer system, may be blended together with 100 parts of polyvinyl chloride, Geon 103–EP (Example 9).

Two (2.0) parts of freshly prepared stabilizer system of control Example 7 may be blended together with 100 parts of polyvinyl chloride, Geon 103–EP (Example 10).

Each of the compositions of Examples 8–10 may be thoroughly blended by milling for 5 minutes on a two-roller differential mill, oil-heated to 325–350° F. (i.e. about 163°–168.5° C.). Continuous bands about 1 millimeter thick may form around one of the rollers. The band may be cut and the sheet removed from the mill and cut into 10 cm. x 10 cm. squares for testing.

It may be observed that the control composition of Example 9 becomes dark during milling, while the compositions of Examples 8 and 10 remain substantially clear.

The squares of Examples 8–10 may be placed in an oven regulated to maintain a temperature of 190° C. Each of the squares of Examples 8–10 may be examined visually after 60 minutes. The squares of Examples 8 and 10 may be observed to have darkened only to a yellow color, while the square of Example 9 may be observed to be even darker than its initial color, being a dark black.

It will thus be apparent that the storage-stable stabilizer composition of this invention permits attainment of stabilizing properties which are essentially identical to those of freshly prepared stabilizer, and far superior to the stabilizing properties of stored stabilizer, containing no storage-stable additive.

Similar results may be obtained using the following mixtures (designated stabilizer compositions "A" and "B").

Stabilizer Composition "A"

| Component: | Parts by weight |
|---|---|
| Cadmium dibenzoate | 15 |
| Barium stearate | 20 |
| Zinc dilaurate | 3 |
| 2-hexoxy-ethanol | 17 |
| 2-ethylhexanoic acid | 17 |

Stabilizer Composition "B"

| Component: | Parts by weight |
|---|---|
| Cadmium di(p-tert-butyl benzoate) | 17 |
| Strontium stearate | 19 |
| Zinc di(p-tert-butyl benzoate) | 4 |
| 2-octoxy-ethanol-1 | 15 |
| 2-ethyl hexanoic acid | 15 |

Although this invention has been described with reference to specific examples, it will be apparent to those skilled-in-the-art that various modifications may be made thereto which fall within the scope of this invention.

I claim:

1. A storage-stable stabilizer composition for vinyl halide resin compositions which comprises as a stabilizer base:
   (a) a cadmium salt of a saturated aliphatic and aromatic monocarboxylic acid;
   (b) a salt selected from the group consisting of barium laurate, barium stearate, barium di-octyl phenolate, barium di-nonyl phenolate, barium di-nonyl-o-cresolate, strontium laurate, strontium stearate, strontium di-octyl phenolate, strontium di-nonyl phenolate, strontium di-nonyl-o-cresolate and mixtures thereof, wherein one of salts (a) and (b) is an aliphatic salt and the other is an aromatic salt;
   (c) a zinc salt selected from the group consisting of zinc (di(p-tert-butyl benzoate), zinc dibenzoate, zinc dilaurate, zinc di(2,4-di-t-butyl benzoate), zinc di(p-chlorophenyl benzoate) and mixtures thereof; and
   (d) as about 1% to 50% by weight of said stabilizer base composition, a storage-stable additive comprising about 1 to 50 parts of a higher alkyl monoether of an alkylene glycol and about 1 to 50 parts of an organic carboxylic acid selected from the group consisting of aliphatic monocarboxylic acids and aliphatic discarboxylic acids of from 2 to 18 carbon atoms.

2. The novel storage-stable stabilizer composition useful for the preparation of heat-stable halogen-containing polymers as claimed in claim 1 wherein said stabilizers base also includes a trio-organo phosphite selected from the group consisting of triphenyl phosphite, tris-nonyl phenyl phosphite, tris-p-chlorophenyl phosphite, phenyl-di-isodecyl phosphite, diphenyl decyl phosphite and mixtures thereof.

3. The novel storage-stable stabilizer composition useful for the preparation of heat-stable halogen-containing polymers as claimed in claim 1 wherein said storage-stable additive comprises about 1 to 50 parts of 2-hexoxy-ethanol-1 and about 1 to 50 parts of 2-ethyl hexanoic acid.

4. The novel storage-stable stabilizer composition useful for the preparation of heat-stable halogen-containing polymers as claimed in claim 1 wherein said storage-stable additive comprises about 3 parts of 2-hexoxy-ethanol-1 and about 3 parts of 2-ethyl hexanoic acid.

5. The novel storage-stable stabilizer composition useful for the preparation of heat-stable halogen-containing polymers as claimed in claim 1 wherein said storage-stable additive is present to the extent of about 6% by weight of said stabilizer composition.

6. A novel storage-stable stabilizer composition useful for the preparation of heat-stable vinyl halide resin compositions which comprises as stabilizer base (a) cadmium (p-tert-butyl benzoate), (b) a barium salt complex of a high molecular weight aliphatic monocarboxylic acid-ester, (c) zinc (p-tert-butyl benzoate), and (d) triphenyl phosphite; and as about 1% to 50% of said stabilizer composition, a storage-stable additive of about 1 to 50 parts of 2-hexoxy-ethanol-1 and about 1 to 50 parts of 2-ethyl hexanoic acid.

7. A heat-stabilized resin composition comprising a halogen-containing resin selected from the group consisting of homopolymers of vinyl chloride and vinylidene chloride, and copolymers of vinyl chloride and vinylidene chloride with other ethylenically unsaturated monomers having incorporated therein from about 0.5% to about 5.0% by weight of a storage-stable stabilizer composition which comprises as stabilizer base:
(a) a cadmium salt of a saturated aliphatic and aromatic monocarboxylic acid;
(b) a salt selected from the group consisting of barium laurate, barium stearate, barium dioctyl phenolate, barium di-nonyl phenolate, barium di-nonyl-o-cresolate, strontium laurate, strontium stearate, strontium di-octyl phenolate, strontium di-nonyl phenolate, strontium di-nonyl-o-cresolate and mixtures thereof, wherein one of salts (a) and (b) is an aliphatic salt and the other is an aromatic salt;
(c) a zinc salt selected from the group consisting of zinc di(p-tert-butyl benzoate), zinc dibenzoate, zinc dilaurate, zinc di(2,4-di-t-butyl benzoate), zinc di-(p-chlorophenyl benzoate), and mixtures thereof; and
(d) as about 1% to 50% by weight of said stabilizer base composition, a storage-stable additive comprising about 1 to 50 parts of a higher alkyl monoether of an alkylene glycol and about 1 to 50 parts of an organic carboxylic acid selected from the group consisting of aliphatic monocarboxylic acids and aliphatic dicarboxylic acids of from 2 to 18 carbon atoms.

References Cited

UNITED STATES PATENTS

| | | | |
|---|---|---|---|
| 2,668,801 | 2/1954 | Schultz | 260—31.8 |
| 3,287,299 | 11/1966 | Canorios et al. | 260—23 |
| 3,338,857 | 8/1967 | Shur et al. | 260—29.6 |

DONALD E. CZAJA, *Primary Examiner.*

H. E. TAYLOR, JR., *Assistant Examiner.*

U.S. Cl. X.R.

252—400, 404, 407; 260—31.4, 33.2, 33.4, 45.7, 45.75, 45.85, 45.95